United States Patent Office 2,976,197
Patented Mar. 21, 1961

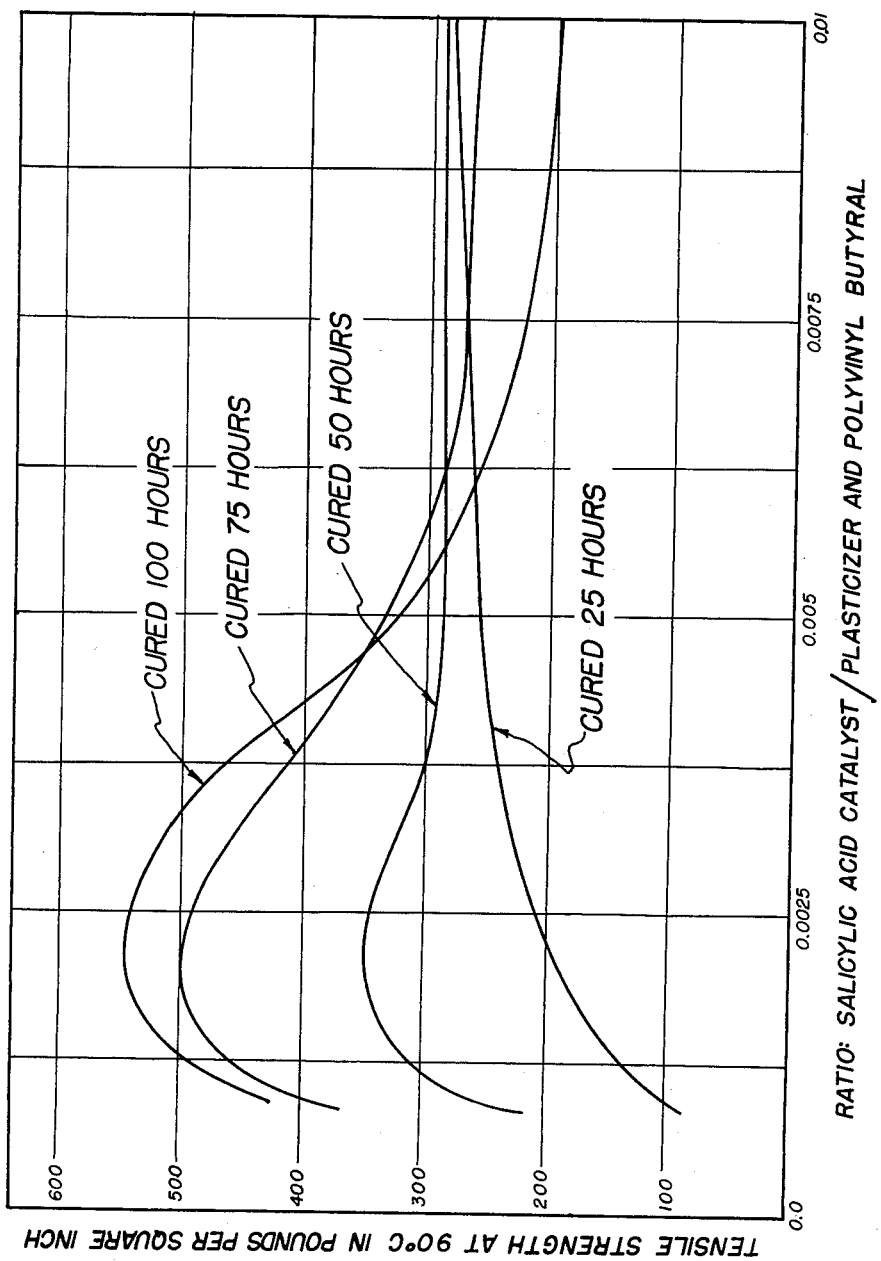

2,976,197
PROCESS FOR LAMINATING GLASS OR PLASTIC MATERIAL

Robert P. Cox, Madison, Wis., assignor to Bjorksten Research Laboratories, Inc., Madison, Wis., a corporation of Illinois Filed Oct. 18, 1954, Ser. No. 462,931

4 Claims. (Cl. 154—2.75)

This invention relates to transparent laminates, and more particularly to laminates of glass or plastic comprising an improved interlayer material, which have a particularly wide range of workable temperature together with high shattering resistance.

Heretofore it has been the practice to laminate glass or methacrylate plastic with resilient interlayers such as polyvinyl butyral, cellulose acetate, cellulose nitrate and the like, and polyvinyl butyral has been the most widely accepted and used interlayer material.

However, while polyvinyl butyral is a highly desirable and suitable material for these purposes in a general fashion, it suffers from the drawback that at temperatures above 50° C. its mechanical properties are exceedingly poor so that it is incapable of performing the desired function. For example, its tensile strength is not greater than 600 to 1000 pounds per square inch at 50° C. and its softening point is lower than 100° C. so that it has substantially no strength at all at 100° C. Particularly in fast-flying aircraft the air friction causes temperature increases much above this range, in consequence of which polyvinyl butyral interlayers become useless in such fast-flying aircraft.

While it is known that the heat resistance of polyvinyl acetals and especially of polyvinyl butyral may be increased by the addition thereto of methylol urea, urea-formaldehyde resins or alcohol-modified urea-formaldehyde resins (alkoxy urea-formaldehyde resins), these modifications suffer from many defects, among which are the following: they react too rapidly at elevated temperatures, yielding thermo-set products which cannot be further processed into the form of a laminate interlayer; they shatter on bullet impact at low temperatures (—40° C.) and they are optically quite imperfect.

The process of manufacturing laminated forms for aeronautical use requires that the laminate be pre-heated at elevated temperatures before molding. Thus, cross-linking additives such as those of this invention must remain dormant during the periods of lamination, pre-heating and molding, becoming active only upon subsequent curing.

It is therefore an object of this invention to provide interlayer materials for laminates, as well as laminates made therefrom, which will have an operable range up to 210° F. (approximately 100° C.) and higher, and down to —60° F. (approximately minus 50° C.) and even lower.

Another object is a laminate interlayer having a high tensile strength at elevated temperature and comprising polyvinyl butyral.

Another object is a polymeric substance comprising polyvinyl butyral and having a high tensile strength at elevated temperatures.

Another object is a laminating layer comprising polyvinyl butyral which does not become discolored on exposure to ultra-violet rays or other radiations in the visible or near-visible range of the electro magnetic spectrum.

Further objects will become apparent as the following detailed description proceeds.

This application is a continuation-in-part of application Serial No. 214,816, now abandoned, filed March 9, 1951.

The figure is a plot of curves showing results obtained with one embodiment of the invention.

One embodiment of my invention is a composition comprising polyvinyl butyral and an aldehyde condensation polymer obtained by reacting an aldehyde with urea and one of the urea and melamine derivatives having attached to a nitrogen atom of the urea or melamine nucleus at least one of the group consisting of an aliphatic group and an alicyclic group, and at least one of the group consisting of hydrogen, hydroxy alkyl and alkoxy alkyl.

Particularly satisfactory results have been obtained by the use of urea derivatives having the following structures:

and

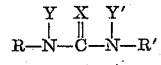

in which X is selected from the group consisting of sulfur and oxygen, R and R' are selected from the group consisting of an aliphatic group having from one through sixteen carbon atoms, an alicyclic group having from five through eight carbon atoms in the ring, and aryl groups with 6 to 20 carbon atoms in the ring, and Y, Y' and Y" are selected from the group consisting of hydrogen, hydroxy alkyl and alkoxyl alkyl.

The urea derivatives suitably include such compounds as 1,3-dimethyl urea, 1,1-diethyl urea, 1,1-dibutyl urea, 1-isopropyl urea, 1-lauryl urea, 1-cyclohexyl urea, 1,3-dibutyl thio urea, phenylurea, monomeric methylol and dimethylol alkyl urea, and alcohol modified alkyl urea formaldehyde, i.e., alkoxy methyl alkyl urea, such as butanol modified ethyl urea formaldehyde.

The condensation product is thoroughly mixed with a polyvinyl acetal, preferably polyvinyl butyral, preferably with a plasticizer, and the mixture then heated to effect a cure so as to obtain the desired interlayer material, which is laminated between sheets of substantially rigid transparent synthetic resin or glass to obtain the desired laminate.

The process for producing the polymeric material may be carried out in one or several stages. For example, the reaction may be carried only partially to completion before the product is mixed with polyvinyl butyral. Both the polymeric product and the reactants may then be mixed with polyvinyl butyral and the reaction may then be carried to completion.

The uncured interlayer material, produced as above, may be formed into sheets, rods, filaments, or tubes or any form suitable for being stretched or elongated and may then be cured by heat while being held in an elongated or stretched position. In this way a novel orientation-cross-linking effect is obtained which increases the tensile strength at 90° C. by as much as 300 percent without impairing low temperature flexibility or other properties.

In each of the following examples the "(a) Resin reactants" were refluxed for one to three hours with an acid catalyst in a flask equipped with a stirrer. The water which was produced, the catalyst and the excess aldehyde were then removed, leaving a resinous polymeric product. A portion of this product was incorporated into a synthetic resin as shown under "(b) Interlayer formulation."

In each of the following examples, the components under "(b) Interlayer formulations" were combined as follows: The catalyst was dissolved in the warmed plasticizer. This solution was then cooled and the polymeric product then added. The then resulting solutions were blended into the polyvinyl butyral, which contained 19 percent of residual —OH groups. Polyvinyl butyral having as little as 7 percent and as much as 40 percent residual —OH groups has been used with success. The blending was accomplished with a rubber knife-mill at a temperature of approximately 95° C. An atmosphere of nitrogen was used in some cases. The resulting plastic mass was pressed for five minutes at 105° C. into sheets of either .025 to .028 inch or .033 to .036 inch thickness. The sheets were cured under the conditions shown. Their thickness was measured and tests were made to determine their physical properties.

Under "(c) Results" are shown the tensile strengths determined at 90° C. and at 110° C. (At both of these temperatures unmodified polyvinyl butyral, either plasticized or unplasticized, has a strength of nil.) In each instance qualitative tests were made to determine other properties: The sheets had great flexibility and impact strength at —40° C. They were clear and transparent and did not darken on exposure to ultraviolet light. A laminate made by pressing the interlayer sheet, before curing, between sheets of methacrylate covered on their inner sides with adhesive had excellent clarity and formability. After curing, no decrease in clarity was noted and no bubbling or delamination occurred. When shot with a .22 calibre bullet at a distance of 10 feet, both at 120° C. and at —10° C., the laminate was found to be shatter proof.

All parts shown below are by weight.

*Example 1*

(a) Resin reactants:
 0.5 mole urea
 0.5 mole 1,3-dimethylurea
 2.2 moles formaldehyde
(b) Interlayer formulation:
 (No catalyst)
 25 parts dibutyl sebacate—plasticizer
 1.0 part polymeric product
 75 parts polyvinyl butyral
 Cured 80 hours at 70° C.
(c) Results:
 525 p.s.i. at 90° C.
 450 p.s.i. at 110° C.

*Example 2*

(a) Resin reactants:
 0.25 mole urea
 0.75 mole 1,1-diethyl urea
 2.2 moles formaldehyde
(b) Interlayer formulation:
 1.0 part benzoic acid—catalyst
 25 parts trioctyl phosphate—plasticizer
 1.0 part polymeric product
 75 parts polyvinyl butyral
 Cured 45 hours at 80° C.
(c) Results:
 450 p.s.i. at 90° C.
 425 p.s.i. at 110° C.

*Example 3*

(a) Resin reactants:
 0.15 mole urea
 0.85 mole 1,1-dibutyl urea
 4.0 moles formaldehyde
(b) Interlayer formulation:
 5.0 parts benzoic acid—catalyst
 23 parts triethyleneglycol di-2-ethyl butyrate—plasticizer
 1.0 part polymeric product
 77 parts polyvinyl butyral
 Cured 70 hours at 70° C.
(c) Results:
 475 p.s.i. at 90° C.
 375 p.s.i. at 110° C.

*Example 4*

(a) Resin reactants:
 0.5 mole urea
 0.5 mole 1,1-dibutyl urea
 2.2 moles formaldehyde
(b) Interlayer formulation:
 1.5 parts benzoic acid—catalyst
 25 parts dibutyl sebacate—plasticizer
 12.0 parts polymeric product
 75 parts polyvinyl butyral
 Cured 15 minutes at 100° C.
(c) Results:
 400 p.s.i. at 90° C.
 290 p.s.i. at 110° C.

*Example 5*

(a) Resin reactants:
 0.15 mole urea
 0.85 mole 1-isopropyl urea
 1.5 moles formaldehyde
(b) Interlayer formulation:
 0.04 part salicylic acid—catalyst
 25 parts trioctyl phosphate—plasticizer
 0.5 part polymeric product
 75 parts polyvinyl butyral
 Cured 50 hours at 70° C. (sheet slightly discolored)
(c) Results:
 540 p.s.i. at 90° C.
 490 p.s.i. at 110° C.

*Example 6*

(a) Resin reactants:
 0.15 mole urea
 0.85 mole 1-ethyl urea
 2.2 moles formaldehyde
(b) Interlayer formulation:
 0.165 part salicylic acid—catalyst
 25 parts dibutyl sebacate—plasticizer
 1.0 part polymeric product
 75 parts polyvinyl butyral
 Cured 80 hours at 70° C.; then cured ½ hour at 110° C. in position of 100% elongation
(c) Results:
 740 p.s.i. at 90° C. } after elongation cure
 700 p.s.i. at 110° C.
 500 p.s.i. at 90° C. } after standard cure but before elongation cure
 475 p.s.i. at 110° C.

*Example 7*

(a) Resin reactant:
 0.3 mole urea
 0.7 mole 1-ethyl urea
 2.2 moles formaldehyde
(b) Interlayer formulation:
 0.5 part benzoic acid—catalyst
 25 parts dibutyl sebacate—plasticizer
 2.0 parts polymeric product
 75 parts polyvinyl butyral
 Cured 10 minutes at 105° C.
(c) Results:
 540 p.s.i. at 90° C.
 425 p.s.i. at 110° C.

*Example 8*

(a) Resin reactants:
 0.2 mole urea
 0.8 mole 1-propyl urea
 1.2 moles formaldehyde (b) Interlayer formulation:
    0.25 part salicylic acid—catalyst
    25 parts triethyleneglycol caproate—plasticizer
    1.0 part polymeric product
    75 parts polyvinyl butyral
    Cured 3 hours at 120° C.
(c) Results:
    465 p.s.i. at 90° C.
    370 p.s.i. at 110° C.

*Example 9*
(a) Resin reactants:
    0.25 mole urea
    0.75 mole 1-octyl urea
    2.2 moles formaldehyde
(b) Interlayer formulation:
    0.2 part salicylic acid—catalyst
    25 parts trioctyl phosphate—plasticizer
    1.5 parts polymeric product
    75 parts polyvinyl butyral
    Cured 40 hours at 70° C.; then cured ¼ hour at 110° C. in position of 600% elongation
(c) Results:
    1000 p.s.i. at 90° C.⎫ after elongation cure
     950 p.s.i. at 110° C.⎭
     360 p.s.i. at 90° C.⎫ after standard cure but be-
     300 p.s.i. at 110° C.⎭ fore elongation cure

*Example 10*
(a) Resin reactants:
    0.3 mole urea
    0.7 mole 1-lauryl urea⎫ refluxed together;
    2.2 moles formaldehyde⎭ then urea
(b) Interlayer formulation:
    0.33 part salicylic acid—catalyst
    25 parts trioctyl phosphate—plasticizer
    1.0 part polymeric product
    75 parts polyvinyl butyral
    (Surface was smooth and waxy.) Cured 55 hours at 78° C.; then cured ½ hour at 110° C. in position of 900% elongation
(c) Results:
    550 p.s.i. at 90° C.⎫ after elongation cure
    500 p.s.i. at 110° C.⎭
    340 p.s.i. at 90° C.⎫ after standard cure but be-
    210 p.s.i. at 110° C.⎭ fore elongation cure

*Example 11*
(a) Resin reactants:
    0.3 mole urea
    0.7 mole 1-n-butyl urea
    2.2 moles formaldehyde
(b) Interlayer formulation:
    0.165 part salicylic acid—catalyst
    25 parts dibutyl sebacate—plasticizer
    1.0 part polymeric product
    75 parts polyvinyl butyral
    Cured 80 hours at 75° C. (sheet slightly discolored)
(c) Results:
    550 p.s.i. at 90° C.
    490 p.s.i. at 110° C.

*Example 12*
(a) Resin reactants:
    0.15 mole urea
    0.85 mole 1-cyclohexyl urea
    2.2 moles formaldehyde
(b) Interlayer formulation:
    0.5 part benzoic acid—catalyst
    25 parts dibutyl sebacate—plasticizer
    1.0 part polymeric product
    75 parts polyvinyl butyral
    Cured 100 hours at 70° C.
(c) Results:
    495 p.s.i. at 90° C.

*Example 13*
(a) Resin reactants:
    0.15 mole urea
    0.85 mole 1-ethyl urea
    2.5 moles acetaldehyde
(b) Interlayer formulation:
    1.0 part benzoic acid—catalyst
    25 parts dibutyl sebacate—plasticizer
    1.0 part polymeric product
    75 parts polyvinyl butyral
    Cured 100 hours at 70° C.
(c) Results:
    495 p.s.i. at 90° C.

*Example 14*
(a) Resin reactants:
    0.5 mole thio urea
    0.5 mole 1,3-dibutyl thio urea
    2.2 moles formaldehyde
(b) Interlayer formulation:
    0.8 part benzoic acid—catalyst
    25 parts dibutyl sebacate—plasticizer
    0.75 part polymeric product
    75 parts polyvinyl butyral
    Cured 65 hours at 85° C.
(c) Results:
    450 p.s.i. at 90° C.
    330 p.s.i. at 110° C.

*Example 15*
(a) Resin reactants:
    0.5 mole urea
    0.5 mole 1,1-diethyl thiourea
    2.2 moles formaldehyde
(b) Interlayer formulation:
    0.4 part salicylic acid—catalyst
    25 parts di-n-hexyl phthalate—plasticizer
    1.5 parts polymeric product
    75 parts polyvinyl butyral
    Cured 80 hours at 75° C.
(c) Results:
    430 p.s.i. at 90° C.
    300 p.s.i. at 110° C.

*Example 16*
(a) Resin reactants:
    0.25 mole urea
    0.75 mole phenylurea
    2.20 moles formaldehyde
(b) Interlayer formulation:
    0.25 part salicylic acid—catalyst
    25.0 parts dibutyl sebacate—plasticizer
    0.5 part polymeric product
    75.0 parts polyvinyl butyral
    Cured 100 hours at 70° C.
(c) Results:
    410 p.s.i. at 90° C.
    395 p.s.i. at 110° C.

*Example 17*
(a) Resin reactants:
    0.33 mole urea
    0.67 mole 1-phenyl, 3-propylurea
    2.20 moles formaldehyde
(b) Interlayer formulation:
    0.5 part salicylic acid—catalyst
    25.0 parts dibutyl sebacate—plasticizer
    0.75 part polymeric product
    75.0 parts polyvinyl butyral
    Cured 50 hours at 80° C.
(c) Results:
    400 p.s.i. at 90° C.
    300 p.s.i. at 110° C.

Example 18

Laminates were formed with each of the interlayer materials of the preceding examples and with many others made according to this invention, in the following manner: In each case two sheets of polymethyl methacrylate each 8" x 8" x 3/16" in size were sprayed on one side only with a copolymer of methyl methacrylate and methacrylic acid to serve as an adhesive. A sheet of the interlayer material was placed between the adhesive-coated sides of these two sheets and the assembly was wrapped in a protective layer of paper and placed in a rubber bag which was then evacuated or was placed in a shallow pan containing a substantially oxygen-free oil. The assembly was then, while thus arranged, held in a press at 50 to 250 pounds per square inch and 70 to 80° C. for approximately one hour. In all cases the resulting laminate was found to have a low-temperature impact strength greater than that of control laminates made similarly but with unmodified plasticized polyvinyl butyral. Tensile strengths were greater than those of the controls and the laminates were quite transparent and substantially unaffected by rays in the ultra-violet and visible spectra.

Example 19

Two laminates were formed with the interlayer materials of Example 9 in accordance with this invention, in the following manner: (a) Two sheets of heat-resistant polymethyl methacrylate known commercially as "Lucite 202" each 8" x 8" x 3/16" in size were sprayed on one side only with a copolymer of methyl methacrylate and methacrylic acid to serve as an adhesive. A sheet of the interlayer material of Example 9 was placed between the adhesive-coated sides of these two sheets and the assembly was placed in a shallow pan immersed in substantially oxygen-free oil; while thus arranged, the assembly was held in a press at 50 to 250 pounds/sq. inch and exposed to a temperature of 320° C. for thirty minutes. The results, in addition to the increased low temperature impact strength over the control laminate as noted in the previous example, showed a substantially bubble-free laminate without striations or any separation of the layers whatever; (b) Two sheets of a heat resistant copolymer of methyl methacrylate and methyl acrylate known commercially as "Plexiglass '2'" were sprayed on one side only with a copolymer of methyl methacrylate and methacrylic acid to form a bond. Then a sheet of the interlayer material of Example 9 was placed between the bonded sides of these two sheets and the preparation was submerged in a shallow pan of substantially oxygen free oil and heated at a temperature of 325° C. for about 25 minutes while under pressure of from 50 to 250 pounds per square inch. This method of lamination also proved almost entirely free of bubbles or separation between the layers.

The above examples indicate the breadth of applicability of my invention but do not by any means exhaust the different possible applications.

The figure shows the results obtained with varied lengths of curing time and varied concentrations of catalyst, in an embodiment in which the reactants and components of the interlayer material were as follows, according to the scheme of the examples:

(a) Resin reactants:
 0.15 mole urea
 0.85 mole 1-ethyl urea
 2.2 moles formaldehyde (b) Interlayer formulation:
 0 to 1.0 part salicylic acid—catalyst (see the figure)
 25 parts dibutyl sebacate—plasticizer
 1 part polymeric product
 75 parts polyvinyl butyral
 Cured at 70° C. for varied lengths of time (see the figure)

(c) Results:
 (See the figure)

It will be seen that the optimum amount of salicylic acid catalyst in this embodiment was approximately ⅓ part per 100 parts of plasticized polyvinyl butyral for curing times of 50 hours and longer and that the maximum tensile strength which was obtained at 90° C. was 540 pounds per square inch.

It may be stated that generally speaking and for most cases, the following variables are important: the concentration of each of the resin reactants, the concentration of each of the interlayer formulation components, the time of mixing in the rubber mill or other equivalent mixing device. The temperature of heating in the rubber mill, the length of the curing time, the temperature of the cure, and the physical circumstances (such as elongation) imposed on the material during the cure. Generally, an increased concentration of urea or thiourea results in increased tensile strength at 90° C. but embrittles the material, as shown by the nature of the fracture. The curing time generally can be shortest for formulations containing large concentrations of urea.

In the embodiment comprising isopropyl urea, sheets produced from resin reactants in which 0.10 to 0.35 mole of urea were used were extremely clear and transparent but with above 0.45 mole of urea, sheets obtained were generally more or less clouded.

The limits for the above noted variables may be stated as follows, following to some degree the scheme used in the examples:

| Variable | Useful | Preferable |
| --- | --- | --- |
| Mole percent of: total number of moles of urea, thiourea and alkyl derivatives of each present in monomeric form as resin-reactants in making the resultant polymeric product | | |
| Urea and Thiourea | 0 to 55 | 5 to 40 |
| Alkylurea and alkylthiourea | 35 to 100 | 60 to 95 |
| Aldehyde | 50 to 700 | 110 to 250 |
| Percent by weight of complete interlayer formulation | | |
| Catalyst | 0.001 to 5 | 0.04 to 2 |
| Polymeric product | 0.1 to 30 | 0.5 to 5 |
| Plasticizer | 10 to 40 | 20 to 30 |
| Polyvinyl butyral | about 60 to about 90 | about 70 to about 80 |
| Hours and minutes | | |
| Mixing time | 1 min to 1 hr | 3 min to 10 min |
| Curing time | 3 min to 500 hr | 10 min. to 75 hr |
| ° C. | | |
| Mixing temperature | 70 to 105 | 90 to 100 |
| Curing temperature | 70 to 200 | 70 to 200 |
| Percent of original length | | |
| Elongation | 100 to 1,500 | 200 to 900 |

Although the use of only a few plasticizers has been shown in the examples, the invention is not limited at all to these but is applicable with any suitable plasticizer known to the art such as any of those disclosed to be compatible or partially compatible with polyvinyl butyral on pages 1066 to 1077 of the 1950 Modern Plastics Encyclopedia and Engineer's Handbook (Plastics Catalogue Corps., New York, 1950), or their practical equivalents.

Catalysts applicable in this invention include not only the benzoic and salicylic acids shown in the examples but also p-toluene sulfonic acid, naphthenic acid, sulfur dioxide, gallic acid, tartaric acid and mellitic acid, The interlayer material of this invention is useful with transparent layers of: glass, polymers and copolymers of acrylic, methacrylic, chloroacrylic and chloromethacrylic acids and their esters, cellulose esters (including the nitrate), and of polymers comprising polyvinyl chloride and of transparent polyester resins. It would clearly be suitable for use with any transparent substantially rigid material.

Although most of the examples have shown the use of a catalyst, such as salicylic acid or benzoic acid, the catalyst or mixture of catalyst used may be varied a good deal. As indicated in the figure, a certain minimum amount of a polymerization catalyst is a virtual necessity in order to provide the desired cross linking action between the polyvinyl butyral and the polymeric reaction product of urea, alkyl urea derivative and aldehyde. This minimum has been found to be generally on the order of about .001 percent of the weight of the final modified polyvinyl butyral product, including plasticizer and other additives which may be included.

Polyvinyl butyral has been generally found preferable. The modification of other polyvinyl acetals, such as polyvinyl acetal itself, polyvinylformal, polyvinyl propional, and the like, may be carried out according to the invention with suitable modifications.

The proportion of the urea-alkylurea derivative-aldehyde polymerization reaction product with respect to polyvinyl butyral is a relatively important factor in determining the physical properties of the polyvinyl butyral as finally modified and it has been found that best physical properties are obtained by the inclusion of .5 to 5 percent of such polymeric product with respect to the total components in the completed interlayer formulation but the beneficial effects of the invention have been observed with the inclusion of as little as .1 percent and as much as 30 percent. A plasticizer is not necessary in order to achieve products according to the invention but in order to achieve a product which is suitable for use as an interlayer it is best to include at least about 10 percent of a suitable plasticizer such as those set forth in the examples and as much as 40 percent may be included, based on the total weight of the completed interlayer formulation; preferable properties for an interlayer between sheets of polymethyl methacrylate have been obtained by the use of 20 to 30 percent. It is generally preferred that polyvinyl butyral constitute the balance of the composition for the most satisfactory interlayer formulation but this is not necessary and other suitable ingredients such as extenders, reinforcing agents, lubricants, and the like, may be included in certain embodiments; suitable proportions are shown in the table above.

Although the use of a curing temperature of at least 70° C. for the curing of the mixture of the polymeric product and polyvinyl butyral has been heretofore described and set forth in the examples, it is possible to obtain an adequate curing for some purposes by the use of a lower temperature and a longer curing time and, likewise, desirable properties can be obtained by conducting the curing at a higher temperature for a shorter period of time. Generally speaking, a curing temperature below about 55° C. is unsuitable in that the time required to obtain a desired degree of cure at such a temperature is so excessive as to be impractical.

One embodiment of the invention involves subjecting the sheet of interlayer material to a second curing step while it is maintained in a position of considerable elongation with respect to its form or shape while undergoing the first curing step. As shown in Examples 6, 9 and 10, a great increase in strength is obtained by subjecting the material to such a second curing step while it is maintained at an elongation of at least 100 percent. Elongation is obtained by stretching the sheet until every portion thereof is elongated in one or more directions at least 100% and subjecting it to further heat while it is maintained in this stretched position. A suitable temperature for conducting the second curing step, which is suitably carried out only while the material is held in the stretched or elongated position, has been found to be approximately 110° C. and although a temperature within 5 to 10° C. of this temperature is preferable, the step may be conducted utilizing temperatures as low as 90° C. and as high as 130° C. On some occasions desirable results have been achieved when the second curing step is carried out while the material is maintained under an elongation of as much as 1500 percent of its original length, although best results are generally achieved by an elongation of no more than 900 percent. It is generally characteristic of the second curing step that it be carried out at a higher temperature and for a shorter time than the first curing step.

Of the aldehydes found suitable for producing the polymeric reaction product of urea, alkylurea derivative and aldehyde, formaldehyde or hexamethylene tetramine are generally preferable and best results have often been achieved with formaldehyde. There may also be used with some success other aldehydes, such as acetaldehyde; there may also be used propionaldehyde, butylaldehyde, and the like, although these are generally less effective than formaldehyde.

The post curing, or second curing step referred to, may be carried out on a sheet or other dimensioned article of the interlayer composition while it is maintained in a frame or stretching device, or it may be carried out while the interlayer material is sandwiched between sheets of rigid transparent material such as glass or polymethylmethacrylate, after being laminated thereto. The sheet may be laminated between sheets of rigid transparent material before being subjected to any cure step and both the first and second curing steps may be carried out while it is so laminated, the necessary elongation necessary as a prerequisite to obtaining the desirable results which may be accomplished with the second curing step being provided by causing the entire laminate to undergo a commensurate dimensional change; for example, the laminate as a whole may be stretched and secured to the interior of a frame or it may be vacuum formed, bag-molded, drape-molded or pressure-molded into a singly- or doubly-curved article such as a cockpit, canopy, navigator's observation dome, or the like, with resultant stretching of both the interlayer and outerlayer materials.

The interlayer sheet, after mixing of the resinous polymeric product, polyvinyl butyral, and other ingredients on a suitable mill, may be provided by suitable forming methods and prior to being incorporated into a laminate may be subjected to a first curing operation. It may then be stretched to provide elongation of 100 percent or more in substantially every portion thereof and may then be laminated while held in the stretched position between sheets of polymethyl methacrylate. The post curing operation at a shorter time and higher temperature may then be conducted while the interlayer material is held between said sheets as a part of the laminate.

In preparing the interlayer material according to the invention, one or more catalysts may constitute a single catalyst component to be included in the mixture which, upon subsequent curing, becomes the desired interlayer material, and one or more plasticizers may be included to provide a single plasticizer component in the mixture.

It is thus apparent that the invention is broad in scope and is not to be restricted except by the claims in which it is my intention to cover all novelty inherent in the invention as broadly as possible, in view of prior art.

Having thus disclosed my invention, I claim:

1. The process of producing a polymeric resinous article comprising in combination the steps of reacting together three components respectively in the mole ratio of from 110 to 250 moles of the first component, 5 to 40 moles of the second component and 60 to 95 moles of the third component, said first component being an aldehyde, said second component being a substance selected from the group consisting of urea and thiourea, said third component being a substance selected from the group consisting of urea derivatives having the following structures:

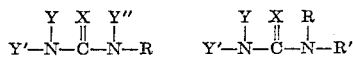

and

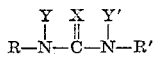

in which X is selected from the group consisting of sulfur and oxygen, R and R' are selected from the group consisting of an alkyl group having from one through sixteen carbon atoms, and a cyclo-paraffinic group having from five through eight carbon atoms in the ring, and Y, Y', and Y" are selected from the group consisting of hydrogen, hydroxy alkyl and alkoxy alkyl; mixing .1 to 30 parts of the polymeric material thus obtained with 60 to 90 parts of polyvinyl butyral and .001 to 5 parts of a catalyst; forming a dimensional article from said mixture; partially curing said article with heat at a temperature from 55° to 105° C.; stretching the article until every portion thereof is elongated at least 100%; and further curing said article with heat at a temperature from 90° to 350° C.

2. The process of producing a polymeric resinous article comprising in combination the steps of reacting together three components respectively in the mole ratio of from 110 to 250 moles of the first component, 5 to 40 moles of the second component and 60 to 95 moles of the third component, said first component being an aldehyde, said second component being a substance selected from the group consisting of urea and thiourea, said third component being a substance selected from the group consisting of urea derivatives having the following structures:

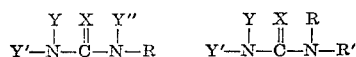

and

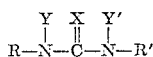

in which X is selected from the group consisting of sulfur and oxygen, R and R' are selected from the group consisting of an alkyl group having from one through sixteen carbon atoms, and a cycloparaffinic group having five through eight carbon atoms in the ring, and Y, Y', and Y" are selected from the group consisting of hydrogen, hydroxy alkyl and alkoxy alkyl; mixing .1 to 30 parts of the polymeric material thus obtained with 60 to 90 parts of polyvinyl butyral and .001 to 5 parts of a catalyst; forming a sheet from said mixture; laminating said sheet between layers of substantially rigid transparent thermoplastic synthetic resin to provide an article; partially curing said sheet with heat while so laminated; stretching said sheet until at least a portion thereof is elongated at least 100% while simultaneously stretching said layers to dimensionally change said layers; and further curing the resultant article with heat at a higher temperature for a shorter time.

3. The process of producing a polymeric resinous article comprising in combination the steps of reacting together three components respectively in the mole ratio of from 110 to 250 moles of the first component, 5 to 40 moles of the second component and 60 to 95 moles of the third component, said first component being an aldehyde, said second component being a substance selected from the group consisting of urea and thiourea, said third component being a substance selected from the group consisting of urea derivatives having the following structures:

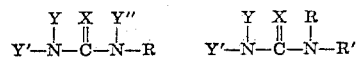

and

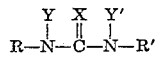

in which X is selected from the group consisting of sulfur and oxygen, R and R' are selected from the group consisting of an alkyl group having from one through sixteen carbon atoms, and a cycloparaffinic group having five through eight carbon atoms in the ring, and Y, Y', and Y" are selected from the group consisting of hydrogen, hydroxy alkyl and alkoxy alkyl; mixing .1 to 30 parts of the polymeric material thus obtained with 60 to 90 parts of polyvinyl butyral and .001 to 5 parts of a catalyst; forming a sheet from said mixture; partially curing said sheet with heat at a temperature from 55° C. to 105° C.; laminating said sheet between layers of substantially rigid transparent material; and further curing said sheet with heat at a temperature from 90° C. to 350° C. while so laminated.

4. The process of producing a polymeric resinous article comprising in combination the steps of reacting together three components respectively in the mole ratio of from 110 to 250 moles of the first component, 5 to 40 moles of the second component and 60 to 95 moles of the third component, said first component being an aldehyde, said second component being a substance selected from the group consisting of urea and thiourea, said third component being a substance selected from the group consisting of urea derivatives having the following structures:

and in which X is selected from the group consisting of sulfur and oxygen, R and R' are selected from the group consisting of an alkyl group having from one through sixteen carbon atoms, and a cyclo-paraffinic group having from five through eight carbon atoms in the ring, and Y, Y', and Y" are selected from the group consisting of hydrogen, hydroxy alkyl and alkoxyl; mixing .1 to 30 parts of the polymeric material thus obtained with 60 to 90 parts of polyvinyl butyral and .001 to 5 parts of a catalyst; forming a sheet from said mixture; partially curing said sheet with heat; juxtaposing said sheet with adjacent laminate layers; stretching said sheet until it is elongated at least 100% in at least one direction; laminating said juxtaposed layers; and further curing the resultant article with heat at a higher temperature than during the initial curing and for a shorter time.

References Cited in the file of this patent

UNITED STATES PATENTS

| | | |
|---|---|---|
| 2,024,389 | Renfrew | Dec. 17, 1935 |
| 2,189,293 | Ostromislensky | Feb. 6, 1940 |
| 2,259,362 | Young | Oct. 14, 1941 |
| 2,263,289 | D'Alelio et al. | Nov. 18, 1941 |
| 2,277,480 | D'Alelio | Mar. 24, 1942 |
| 2,278,375 | Olin | Mar. 31, 1942 |
| 2,326,698 | Swain et al. | Aug. 10, 1943 |
| 2,345,013 | Soday | Mar. 28, 1944 |
| 2,360,650 | Crane | Oct. 17, 1944 |
| 2,392,041 | Groff | Jan. 1, 1946 |
| 2,397,231 | Barnes | Mar. 26, 1946 |

(Other references on following page)

UNITED STATES PATENTS

| | | |
|---|---|---|
| 2,413,970 | Hawley | Jan. 7, 1947 |
| 2,453,308 | Dunlop | Nov. 9, 1948 |
| 2,512,672 | Novotny et al | June 27, 1950 |
| 2,514,195 | Kuhn | July 4, 1950 |
| 2,594,229 | Synder et al. | Apr. 22, 1952 |
| 2,612,079 | Mahler | Sept. 30, 1952 |
| 2,627,088 | Alles et al. | Feb. 3, 1953 |
| 2,669,535 | Orr | Feb. 16, 1954 |

FOREIGN PATENTS

| | | |
|---|---|---|
| 419,826 | Great Britain | Nov. 19, 1934 |